United States Patent
Walton et al.

(10) Patent No.: US 10,231,474 B2
(45) Date of Patent: Mar. 19, 2019

(54) SWEET TASTE IMPROVING COMPOSITIONS INCLUDING NARINGENIN

(71) Applicant: DR PEPPER/SEVEN UP, INC., Plano, TX (US)

(72) Inventors: Stacey K. Walton, Frisco, TX (US); Gino E. Olcese, Allen, TX (US)

(73) Assignee: DR PEPPER/SEVEN UP, INC., Plano, TX (US)

( * ) Notice: Subject to any disclaimer, the term of this patent is extended or adjusted under 35 U.S.C. 154(b) by 815 days.

(21) Appl. No.: 14/271,223

(22) Filed: May 6, 2014

(65) Prior Publication Data

US 2015/0320101 A1 Nov. 12, 2015

(51) Int. Cl.
*A23L 2/60* (2006.01)
*A23L 2/56* (2006.01)

(52) U.S. Cl.
CPC .. *A23L 2/60* (2013.01); *A23L 2/56* (2013.01)

(58) Field of Classification Search
CPC ..................................... A23L 2/56; A23L 2/60
USPC ............... 426/534, 541, 548, 590, 650, 658
See application file for complete search history.

(56) References Cited

U.S. PATENT DOCUMENTS

| | | |
|---|---|---|
| 2007/0116838 A1 | 5/2007 | Prakash et al. |
| 2011/0183056 A1 | 7/2011 | Morita et al. |
| 2012/0041078 A1 | 2/2012 | Tachdjian et al. |
| 2013/0136839 A1 | 5/2013 | Putter et al. |
| 2014/0030381 A1 | 1/2014 | Markysyan |
| 2014/0271996 A1* | 9/2014 | Prakash .................... A23L 2/60 426/66 |
| 2014/0342043 A1* | 11/2014 | Bell ......................... A23L 2/385 426/72 |
| 2015/0017284 A1* | 1/2015 | Prakash ................ A23L 1/2366 426/61 |
| 2015/0018432 A1* | 1/2015 | Prakash ................. A61K 47/36 514/777 |

FOREIGN PATENT DOCUMENTS

| | | |
|---|---|---|
| WO | WO 2013079187 A2 | 6/2013 |
| WO | WO2013096420 | 6/2013 |
| WO | WO2013102793 | 7/2013 |
| WO | WO2013176738 | 11/2013 |

OTHER PUBLICATIONS

International Search Report on Patentability dated Jul. 24, 2015 issued in corresponding PCT/US15/29445 (9 Pages).
Morita Kagaku Kogyo Co., Ltd., http://www.morita-kagaku-kogyo.co.jp, printed Jul. 22, 2014 (4 pages).

* cited by examiner

*Primary Examiner* — Leslie A Wong
(74) *Attorney, Agent, or Firm* — Pizarro Allen PC

(57) ABSTRACT

A consumable composition may include naringenin at concentrations suitable to improve certain characteristics of the composition. Naringenin may, for example, be added to a composition or included in a sweetening composition that may be added therein to adjust sweetness attributes. For example, beverages that include one or more steviol glycosides may typically be deficient in upfront sweetness, and naringenin may be added therein to improve the temporal profile of sweetness delivery.

19 Claims, 1 Drawing Sheet

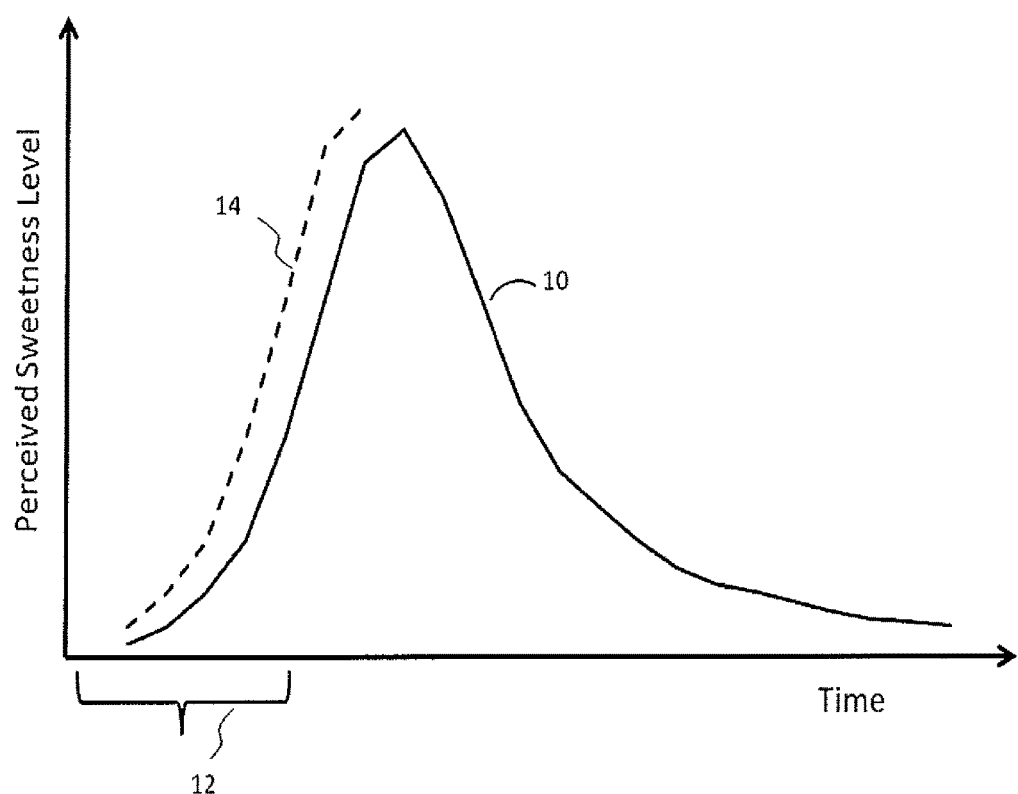

SWEET TASTE IMPROVING COMPOSITIONS INCLUDING NARINGENIN

FIELD

The present application relates to sweet taste improving compositions, which, for example, can be used in foods, beverages, and pharmaceutical applications, and the use of sweet taste improving compositions in reduced-calorie products.

BACKGROUND

Diet or reduced-calorie versions of products that are typically sweet may have reduced sugar content, and therefore a lowered contribution of sweetness afforded from caloric sugars. To raise the sweetness level and compensate for the lack of sugar, reduced-calorie products may substitute another sweetening component, e.g., such products may contain high-potency sweeteners, non-nutritive sweeteners, or combinations thereof. Unfortunately, according to many consumers, such sweeteners, individually or in combination, do not impart exactly the same taste as natural sugars, and such consumers may experience negative taste characteristics of consumable items that include those sweeteners. For example, negative attributes associated with such consumable items may include, but are not limited to, a lack of upfront sweetness, lingering sweetness, and a lack of overall flavor. Additionally, the general mouthfeel of reduced-calorie consumable items may suffer in the absence of the syrup-like feel or texture that is associated with sugars.

Some of the negative attributes associated with non-sugar sweeteners are related to the temporal profile for initiation of sweetness; that is, following consumption, the time course for delivery of the perception of sweetness. Generally, natural sugars, such as sucrose, which provide sweetness rapidly following consumption and with an appealing rounded profile, are considered to possess an ideal temporal profile. Non-sugar sweeteners may not perfectly match the same time course for sweetness delivery. Moreover, non-sugar sweeteners may, in addition to not providing sweetness with the same temporal pattern as certain natural sugars, also initiate the perception of other tastes. For example, many consumers describe artificial sweeteners as being associated with certain taste perceptions, such as metallic, bitter, dry, astringent, other taste perceptions, or combinations thereof. Such perceptions may be particularly strong in periods following consumption, that is, artificial sweeteners may be associated with aftertaste impressions. Attempts have been made to inhibit or remove aftertastes or other negative characteristics of non-sugar sweeteners. For example, combinations of sweeteners and addition of taste inhibitors have been used to attempt to improve the taste characteristics of non-sugar sweeteners. Such approaches have not been entirely successful. Moreover, those approaches typically rely on the use of specific combinations of sweeteners and/or taste inhibitors, and the presence of such reagents in specific and narrow ranges.

Even if such approaches are partially successful in one product, those approaches may not be applicable to a range of other products, because, for example, different products may have different flavors and may possess notes that interact with added inhibitors or sweeteners in unintended ways. For example, even if successfully used in one beverage, some reagent combinations may, when used in other beverages, create products that lack mouthfeel, possess artificially tasting flavor notes, produce a beverage with a sweetness profile that is different from natural sugar, or inadvertently remove flavor notes that are desirable. Such characteristics may complicate production of beverages. In addition, such characteristics may hinder the design of products that may be provided as sugar-free or reduced-calorie versions and that may be sweetened or flavored by consumers to tailor products to individual taste preferences and desired calorie levels.

It is therefore desirable to develop methods for alleviating or reducing negative taste perceptions associated with certain artificial sweeteners by using strategies that are applicable to a variety of sweetener blends and to provide beverages with sweetness delocalization and improved mouthfeel. It is further desirable to provide sweetening or non-sweetening compositions that may be used with different beverages and, particularly, with sweet beverages that include other flavors, such as bitter, sour, and astringent notes.

SUMMARY

In some embodiments, a beverage may include a *stevia* extract in an amount of about 100 ppm to about 600 ppm. The *stevia* extract may provide greater than about 50% of the total sweetness provided in the beverage, the most prevalent steviol glycoside of the *stevia* extract being one of rebaudioside A and rebaudioside D. That most prevalent glycoside may be present in the *stevia* extract at a level of between about 30% to about 99.9% by weight in the *stevia* extract. The beverage may further have a calorie content of less than about 70 calories for an 8 oz portion of the beverage. Naringenin may further be added in an amount of between about 10 ppm to about 50 ppm. The beverage may include a ratio of *stevia* extract to naringenin of between about 15:1 to about 8:1.

In some embodiments, a beverage may include a *stevia* extract that includes rebaudioside M. For example, the extract may include rebaudioside M in an amount of between about 30% to about 90% by weight. The extract may be the primary sweetener in the beverage and may be present in an amount sufficient to provide a sucrose equivalent sweetness of between about 12 grams of sucrose to about 38 grams of sucrose per 8 fluid ounces of the beverage. Naringenin may further be added to the beverage in an amount of between about 10 ppm to about 50 ppm. The beverage may include a ratio of *stevia* extract to naringenin of between about 15:1 to about 8:1 to increase upfront sweetness as compared to a similar beverage without naringenin.

In some embodiments, a beverage may include a *stevia* extract in an amount of about 100 ppm to about 600 ppm. For example, the extract may include at least one of rebaudioside A, rebaudioside D, and rebaudioside M present in the *stevia* extract at about 30% to about 99.9% by weight with respect to the total amount of said *stevia* extract. The beverage may further include one or more high-potency or non-nutritive sweeteners that are deficient in upfront sweetness, including erythritol, mogroside V, aspartame, sucralose, and combinations thereof. Naringenin may further be added to the beverage in an amount of between about 20 ppm to about 100 ppm.

BRIEF DESCRIPTION OF THE DRAWINGS

FIG. 1 shows a graph of the perceived sweetness over time for a model sweetener and an increase in upfront sweetness for the model sweetener upon addition of naringenin to the model sweetener.

DETAILED DESCRIPTION

The following terms as used herein should be understood to have the indicated meanings.

When an item is introduced by "a" or "an," it should be understood to mean one or more of that item.

"Comprises" means includes but is not limited to.

"Comprising" means including but not limited to.

"Having" means including but not limited to.

The term "beverage," as used herein, means any drinkable liquid or semi-liquid including, for example, flavored water, soft drinks, fruit drinks, smoothies, coffee-based drinks, tea-based drinks, juice-based drinks, milk-based drinks, dairy compositions, gel drinks, soy-based drinks, protein drinks, carbonated or non-carbonated drinks, alcoholic or non-alcoholic drinks.

The term "consumable item" means anything that may be orally ingested by a consumer, including without limitation a food, beverage, pharmaceutical composition, nutraceutical composition, vitamin, lozenge, dietary supplement, confection, chewing gum, candy and a combination of any of the foregoing.

The term "primary sweetener" refers to any sweetener that provides the largest proportion of total sweetness of any component in a sweet composition or beverage.

The term "*stevia* extract" means a material comprising at least one steviol glycoside and derived from plants of the genus *Stevia* including, for example, the species *Stevia rebaudiana*.

The term "high-potency sweetener" means any ingredient that initiates a perception of sweetness at a concentration less than that which would be required for a natural-caloric sweetener. High-potency sweeteners include by way of nonlimiting example acesulfame-k, aspartame, saccharin, *stevia*, and sucralose, and combinations thereof.

The term "non-nutritive sweetener" refers to any of various materials that initiate a perception of sweetness and provide less than about half the caloric content per unit weight that sucrose does.

This disclosure is directed to taste modifying compositions that include naringenin and the use of such compositions to improve characteristics of consumable products with reduced-calorie content when compared to other full-calorie product versions. Naringenin may, for example, be added to a beverage or included in a sweetening composition to adjust sweetness attributes of beverages. In particular, sweetness characteristics of beverages that include certain high-potency or non-nutritive sweeteners may be improved with naringenin, and, for example, the taste profile may become more similar to beverages sweetened with natural sugar. For example, beverages that include one or more steviol glycosides, such as rebaudioside A, rebaudioside D, and rebaudioside M, may typically be deficient in upfront sweetness as compared to a level of upfront sweetness provided in a beverage sweetened with natural sugar, and in some embodiments, naringenin may be included in those beverages to improve the temporal profile of sweetness delivery. Naringenin may also be used in combination with steviol glycosides, such as rebaudioside A, stevioside, dulcoside, rebaudioside B, and rebaudioside C, that provide a bitter aftertaste upon consumption, including some rebaudioside compounds that may be present as minor components of *stevia* leaf. And in some embodiments, naringenin may facilitate the use of those steviol glycosides or extracts of *stevia* including those glycosides in a beverage by improving aftertaste and/or improving upfront sweetness characteristics of the beverage.

Reduced-calorie beverages that include naringenin may help provide, upon consumption, a desirable reduction in calories as compared to a similar full-calorie beverage. For example, in some embodiments, a desired reduction in calorie content, e.g., from a full-calorie version of a product, may be selected, such as a 20% reduction, 30% reduction, 40% reduction, 50% reduction, 75% reduction, or 95% reduction. In other embodiments, naringenin may be used in products that are essentially calorie-free. Some of the products, e.g., in which naringenin may be added, may include by way of nonlimiting example, those listed in table A below:

TABLE A

| Product | Calories/8 oz |
| --- | --- |
| Soft Drink (High Calorie) | 120 |
| Soft Drink (Regular) | 100 |
| Tomato Based Beverages | 60 |
| Lemonade | 90 |
| Juice | 130 |
| Tea | 80 |
| Chocolate Drink | 110 |
| Juice Drink | 100 |
| Non-Alcoholic Mixers | 150 |

The data in Table A represent typical full-calorie contents of some of the products described herein. As noted in Table A, some soft drinks, e.g., cream sodas and root beers, and some other soft drinks, may have up to about 120 calories for an 8 ounce portion. Other soft drinks, such as some cola flavored soft drinks, may have up to about 100 calories for an 8 ounce portion.

For example, a reduced-calorie beverage may be a lemon-flavored drink, such as lemonade, and may include a calorie reduction of about between 30% to about 50% as compared to its full-calorie equivalent. The beverage may, for example, include between about 45 calories to about 65 calories per 8 fluid ounces. Also by way of example, a reduced-calorie beverage may be a soft drink and may include a calorie reduction of between about 30% to about 100% from that typical of a full-calorie product version and may include between about 0 calories to about 70 calories per 8 fluid ounces. Depending on a desired level of calorie reduction, an amount of nutritive sweeteners may also be included. For example, in some embodiments, one or more nutritive sweeteners including, by way of nonlimiting example, glucose, fructose, galactose, xylose, lactose, ribose, sucrose, lactulose, maltose, trehalose, another sugar, or combinations thereof may be added.

Naringenin is a non-caloric flavanone that may be isolated from natural sources, including, for example, citrus fruits such as orange and grapefruit. In some embodiments, naringenin may be added to a beverage in the form of a citrus extract and may further include other compounds such as naringin or other compounds that may also be present in citrus fruits. Additional compounds to naringenin, which may be present in a naringenin extract or added to a composition including naringenin, may provide at least some detectable bitterness. And in some embodiments, a taste modifying composition may be bitter and may include, in addition to naringenin, at least one or more bitterness or other taste inhibitors. For example, in some embodiments, a beverage may include naringenin and further include one or more of trilobatin, phloretin, 3-hydroxybenzoic acid, 3,4- hydroxybenzoic acid, glycyrrhizic acid, or any combinations of the taste modifiers thereof. In some embodiments, an extract may be enzymatically treated to remove at least some bitter compounds and/or residual sweet compounds that may otherwise be present in detectable amounts.

It has unexpectedly been found that naringenin and extracts including naringenin may be combined with high-potency and/or non-nutritive sweeteners to provide beverage products with improved sweetness profiles, including upfront sweetness. For example, in combination with high-potency sweeteners, such as rebaudioside A, rebaudioside D, and rebaudioside M, naringenin significantly shifts the perceived temporal profile of sweetness delivery, providing increased upfront sweetness and rounding the overall temporal profile of sweetness delivery, thereby improving the overall taste of beverages. Moreover, syrup-like texture, a characteristic typically lacking from reduced-calorie beverages, may be significantly improved with naringenin.

It has further been unexpectedly discovered that adding naringenin at certain concentration levels below noticeable taste levels may result in beverages with improved sweetness. That is, improvements in taste may be present even in the absence of any detectable flavor or taste attribute provided individually from naringenin. For example, even at concentrations as low as between about 5 ppm to about 10 ppm, naringenin may, in some beverages, improve upfront sweetness, overall mouthfeel, and sweetness delocalization. Moreover, when used at concentrations greater than 10 ppm, naringenin does not typically provide a noticeable taste perception, such as sweetness. For example, in water, naringenin does not elicit any taste or flavor in concentrations up to at least 200 ppm. As further described herein, those attributes may be particularly beneficial for some beverages including those that may include sweeteners of only marginal stability and those amenable to sweetening or other flavoring adjustment, such as, for example, adjustment at the point of consumption by a consumer.

In some embodiments, a beverage may include naringenin and one or more steviol glycosides. While steviol glycosides provide a natural source of sweetness and may be desirable for use in reduced-calorie products, when included in significant amounts, certain steviol glycosides, such as rebaudioside A, stevioside, dulcoside, rebaudioside B, and rebaudioside C, may tend to provide a tailing bitter aftertaste as well as lingering sweetness. In addition, many of the steviol glycosides provide only a fraction of the upfront sweetness of natural sugar, and even rebaudioside D (which among steviol glycosides provides a higher level of upfront sweetness) is deficient in upfront sweetness as compared to natural sugar. For example, rebaudioside A and stevioside are among the most common steviol glycosides and exhibit high sweetness intensity; however, when used in amounts sufficient to provide greater than about a 10% to about a 20% level of equivalent sweetness of sucrose (based on levels of sucrose that may be present in a full-calorie beverage) those sweeteners exhibit a tailing bitter aftertaste, lingering sweetness, and also provide less upfront sweetness than natural sugar. However, in combination with naringenin, reduced-calorie products that include steviol glycosides possess an improved sweetness profile with enhanced upfront sweetness. In addition, such products also provide an improved syrup-like texture, and for example, any tailing bitter aftertaste becomes more syrupy and similar to full-calorie product versions. Therefore, the temporal profile of sweetness delivery, mouthfeel, and aftertaste properties may be significantly improved by naringenin.

In an exemplary manner, FIG. 1 shows a curve 10 showing the temporal profile of sweetness delivery for a model sweetener, although a particular sweetener may have a different temporal profile and the sweetness may start, peak and linger at various times and rates. The model sweetener may be characterized by an increase in perceived sweetness following sweetener consumption. Upon addition of naringenin to the model sweetener, the perceived sweetness measured upon consumption during the initial time period 12 may generally be increased (as illustrated by the dashed curve 14) and the profile of sweetness delivery shifted towards earlier times.

Those improvements may be present and may be successfully incorporated in beverages even when steviol glycosides are used at sucrose equivalent sweetness levels facilitating substantial reduction in calorie content; that is, where improvements in sweetness profile and/or aftertaste characteristics are clearly not attributable to covering negative taste characteristics with an amount of caloric sugars. For example, in some embodiments, steviol glycosides may be included in combination with naringenin in a beverage and may be present at levels suitable to provide a sucrose equivalent sweetness level of greater than about 50% or greater than about 80% of that typical of a full-calorie beverage. And, in some embodiments, substantially calorie-free versions of beverage products may be made using only natural sweeteners. For example, a *stevia* extract may be used individually or in combination with one or more other natural sweeteners, such as Lo Han Guo fruit extract. Moreover, because naringenin is also a natural ingredient, beverages described herein may, in some embodiments, include only natural sweeteners and natural taste modifiers. And, in some embodiments, a beverage may include entirely natural ingredients. For example, in some embodiments, a beverage may include only natural sweeteners, taste modifiers, flavors, colors, preservatives, buffers, other natural ingredients, and combinations thereof.

By way of further example, in some embodiments, steviol glycosides may be included along with naringenin and those glycosides may be present in levels sufficient to provide a sucrose equivalent sweetness of up to about 38 grams of sucrose per 8 fluid ounces. In some embodiments, a *stevia* extract may include one or more steviol glycosides and may be the primary sweetener in a beverage and provide a sucrose equivalent sweetness of between about 12 grams to about 38 grams of sucrose per 8 fluid ounces. And, in some embodiments, the beverage may be reduced in calorie content or may be calorie free.

Naringenin may, for example, be included in a beverage along with one or more of the most prevalent steviol glycosides in *stevia* leaf such as rebaudioside A and stevioside. A beverage may also or alternatively include naringenin and other lesser components of *stevia* leaf including, by way of nonlimiting example, any of rebaudioside B, rebaudioside C, rebaudioside D, rebaudioside E, rebaudioside F, rebaudioside G, rebaudioside H, rebaudioside I, rebaudioside J, rebaudioside M, rebaudioside N, rebaudioside O, rubusoside, or dulcoside. In some embodiments, in addition to naringenin, one or more components of *stevia* leaf may be included in a beverage and the components may include those that may be bitterer than rebaudioside A, rebaudioside D, or an enzyme-modified *stevia* leaf extract as well as those that may provide less upfront sweetness than rebaudioside A or D.

Steviol glycosides may be isolated (or at least in part purified) from plants of the genus *Stevia*, including from the species *Stevia rebaudiana*, and may be added as a *stevia* leaf extract. A number of strategies may be used to process and/or purify to a desired degree components that may be present in a *stevia* leaf extract. For example, extraction in supercritical fluid or in other types of solvents (e.g., aqueous and/or organic), recrystallization, membrane filtration, and/or various chromatographic or other column based procedures may all be used in various processes to purify rebaudiosides or other components of a *stevia* extract. The various preparative methods may be more or less difficult to apply in commercial practice and all of the methods add cost and a degree complexity. And, for some methods, particularly where substantially pure rebaudioside species are desired and/or where multiple processing steps may be applied, expenditures of time necessary to substantially isolate a desired species may be substantial. Processing time may further increase for minor constituents of *stevia* (such as rebaudioside M) that only exist in low concentrations.

While in some embodiments, a substantially purified rebaudioside (such as rebaudioside A, D, or M) may be added with naringenin in a beverage, the presence of naringenin may also, in some embodiments, be used to relax purity requirements and/or a reliance on a particular steviol glycoside or distribution of steviol glycosides. For example, naringenin may be used to alleviate deficiencies of the more bitter steviol glycosides and/or steviol glycosides with less ideal sweetness profiles, particularly those that lack upfront sweetness. And, by masking or alleviating negative attributes of those glycosides, those glycosides may be successfully included in a beverage. For example, in some embodiments, the most prevalent steviol glycoside in a *stevia* extract may be one of the rebaudiosides A, D, or M. And, the most prevalent steviol glycoside in the extract may be present in an amount of between about 30% to about 99.9% by weight. Therefore, the *stevia* extract may range from high levels of purity to significantly lower levels of purity, including levels of purity that, without naringenin, may provide unacceptable levels of negative taste perceptions, such as from minor components in the extract, when used in a beverage. And, in some embodiments, a process strategy that may be more cost-effective, faster, and/or simpler than other processes may be suitably used in making a beverage by addition of naringenin.

In some embodiments, a method of improving a sweetness temporal profile, flavor profile, or both of a consumable composition may include combining the composition with naringenin. For example, in some embodiments, the composition may be a beverage composition that is sweetened with one or more high-potency or non-nutritive sweeteners that lack upfront sweetness or that provide a bitter flavor profile. And in some embodiments, the composition may include or be a sweetener that lacks upfront sweetness when compared to natural sugar, including, by way of nonlimiting example, rebaudioside A, rebaudioside D, rebaudioside M, *stevia* extract, Lo Han Guo fruit extract, mogroside, erythritol, aspartame, sucralose, or any combinations of sweeteners thereof.

In some embodiments, a method of increasing the taste stability of a sweetened beverage may include combining the sweetened beverage with naringenin, which is generally stable over time under most beverage conditions. For example, a beverage may include one or more components of *stevia* leaf that, for example, during processing and/or storage, may be subject to changes or variability in a distribution of more bitter or sweetness deficient components. And, in some embodiments, the beverage may be a packaged beverage that includes a pH value of between about 3 to about 4 and may be stored with or without refrigeration.

Including naringenin in a beverage may help diminish levels of bitterness and/or sweetness deficiency in the beverage. Furthermore, because naringenin may be added (without adding other taste perceptions or calories) to a beverage in significant excess of a minimum concentration to alleviate one or more negative taste characteristics, it may, in some embodiments, be suitably added in an excess of an amount that is necessary to alleviate the negative taste characteristic. And, in some embodiments of methods of making a beverage, naringenin may be added at a level that is between about 20% to about 100% or up to about 50% to about 200% higher than may be necessary to alleviate one or more negative taste characteristics of the beverage. For example, in some embodiments, an amount of about 10 ppm to about 20 ppm of naringenin may be sufficient to alleviate a negative taste characteristic of a beverage, and an amount of about 20 ppm to about 40 ppm may be selected for use in the beverage without causing adverse effects on taste.

A *stevia* extract may, in some embodiments, be included in a beverage along with naringenin and may be the primary sweetener in the beverage. And, in some embodiments, the most prevalent steviol glycoside of a *stevia* extract may be one of the rebaudiosides A, D, or M. For example, in some embodiments, an amount of one of the rebaudiosides A, D, or M in a *stevia* extract may be any value from about 30% to about 99.9% by weight of the extract. And, by including naringenin at levels of between about 10 ppm to about 50 ppm, levels of rebaudioside purity required for an extract may be relaxed.

In some embodiments, a beverage may include a *stevia* extract including at least one of the rebaudiosides A, D, or M wherein the most prevalent rebaudioside may be present at less than about 90% purity, less than about 80% purity, less than about 70% purity, less than about 60% purity, or less than about 50% purity (all % based on weight of the total extract). In some embodiments, the remaining percentage of the *stevia* extract may further include one or more other components of *stevia* leaf selected from a group of more bitter tasting components and/or components that provide less upfront sweetness than either of the rebaudiosides A and D. And, in some embodiments, those other components may be present at greater than trace amounts. For example, in some embodiments, those other components may comprise a majority portion (e.g., greater than 50%) of the remaining percentage of the extract.

By way of further example, in some embodiments, the most prevalent component of a *stevia* extract may be one of the rebaudiosides A, D, or M and may be present at about 60% purity. And, the remaining portion of the extract (i.e., the remaining 40% in this example) may include a majority portion of a group of more bitter tasting components and/or components that provide less upfront sweetness than either of the rebaudiosides A and D.

For example, and without limitation, a group of components of *stevia* leaf more bitter tasting than either of the rebaudiosides A and D may include stevioside, dulcoside, rebaudioside B, and rebaudioside C. Also by way of non-limiting example, a group of components of *stevia* leaf more deficient in upfront sweetness than either of the rebaudiosides A and D may include stevioside, dulcoside, rebaudioside B, rebaudioside C, and rebaudioside M. And, in some embodiments, naringenin may be used to diminish negative attributes of a beverage including any one of those aforementioned components or combinations of the aforementioned components thereof.

To test whether naringenin is present in an amount sufficient to diminish a negative attribute of a composition, a test protocol may be executed. For example, to test whether an amount of naringenin is sufficient to alleviate a deficiency of upfront sweetness or presence of a bitter aftertaste, a desired amount of a rebaudioside may be added to the composition, and the composition may be taste tested to determine whether the rebaudioside provides one or more negative taste attributes to the composition. Then, by adding various amounts of naringenin, a sufficient amount of naringenin to diminish the negative taste characteristic may then be determined. In addition, a protocol may include addition of a desired amount of a first rebaudioside, such as, for example, one of rebaudioside A, rebaudioside D, or rebaudioside M, to a composition. Thereafter, another component, such as a component of *stevia* leaf selected from a group of more bitter tasting components and/or components that provide less upfront sweetness than either of the rebaudiosides A and D, may be added to the composition in a known amount. For example, a known amount of rebaudioside A may be added to a composition together with a known amount of rebaudioside C, which is both lacking in upfront sweetness and more bitter than both rebaudioside A and D. Then, by adding various amounts of naringenin to the composition, a sufficient amount of naringenin to diminish a negative taste characteristic may then be determined. In some embodiments, an amount of naringenin suitable to remove a negative taste perception provided by the less desired rebaudioside (e.g., rebaudioside C as described above) may be determined. And, for example, in this manner, based on known addition of substantially pure ingredients, one may test whether an impure *stevia* extract may likely be used to successfully sweeten a consumable composition. For example, a test protocol involving adding purified forms of different rebaudiosides may be a more efficient process than procuring impure samples and then determining the specific composition of any minor components therein, some of which may be difficult to separate.

In some embodiments, steviol glycosides may be provided to a beverage, or configured in a composition for being provided to a beverage, at a level of between about 80 ppm to about 600 ppm. Within this range, steviol glycosides may be included in an amount of up to about 120 ppm, up to about 180 ppm, up to about 250 ppm, or up to about 400 ppm. Also within this range, steviol glycosides may be included in an amount of at least 100 ppm, at least 150 ppm, or at least 250 ppm. In some embodiments, the beverage may further include naringenin at levels of between about 10 ppm to about 50 ppm, about 12 ppm to about 40 ppm, or about 15 ppm to about 25 ppm. A beverage may, in some embodiments, include steviol glycosides and naringenin in a weight ratio of steviol glycosides to naringenin of about 25:1 to about 4:1 or about 15:1 to about 8:1.

In some embodiments, beverages including naringenin may, in addition to one or more steviol glycosides, further include one or more other sweeteners. For example, steviol glycosides may be included along with a high-potency sweetener and/or a non-nutritive sweetener (e.g., one or more sugar alcohols) in a beverage. In some of those embodiments, the additional sweeteners may even include one or more sweeteners that, like steviol glycosides, may adversely affect the sweetness profile of a beverage. For example, steviol glycosides may be used in combination with sucralose. The combination of two or more sweeteners that individually provide lingering sweetness and/or that lack upfront sweetness normally would be avoided because negative taste attributes may be magnified by such combination. However, addition of naringenin may be used to overcome such deficiencies, and combinations of sweeteners that otherwise would be avoided may then be used. For example, some sweetener combinations may be used that otherwise would not provide an acceptable taste profile, but in combination with naringenin, the sweeteners may provide an acceptable taste profile as well as improved sweetness stability (e.g., over time, across pH values, or at different temperatures).

In some embodiments, a composition may include naringenin, steviol glycosides, and the sweetener acesulfame-potassium. It may be desirable to include acesulfame-potassium in a beverage because the sweetener may provide high levels of upfront sweetness, which as discussed previously is an attribute generally lacking in reduced-calorie beverages. Therefore, acesulfame-potassium may work together with naringenin to enhance upfront sweetness. Unfortunately, like beverages that include steviol glycosides, consumers may perceive that beverages that include acesulfame-potassium provide a bitter aftertaste. Therefore, beverages that include steviol glycosides and acesulfame-potassium would normally be avoided because the individual bitterness of those sweeteners may be augmented in the combination. However, when naringenin is further added to beverages including both steviol glycosides and acesulfame-potassium, the bitterness of that combination may be significantly diminished and a combination of steviol glycosides and acesulfame-potassium may then be successfully used. In some embodiments, for example, a beverage may include steviol glycosides in a concentration of between about 80 ppm to about 600 ppm, acesulfame-potassium in a concentration of between about 1 to about 120 ppm or about 50 ppm to about 100 ppm, and naringenin in a concentration of between about 10 ppm to about 50 ppm.

In some embodiments, naringenin may be added to one or more sweeteners that individually or in combination may provide a level of upfront sweetness that is less than typically desired by a consumer, e.g., less than a level of upfront sweetness provided by natural sugars. For example, in some embodiments, naringenin may be added to one or more of the sweeteners including by way of nonlimiting example rebaudioside A, rebaudioside D, rebaudioside M, Lo Han Guo fruit extract, mogroside V, erythritol, and combinations thereof. And in some embodiments, at least one of the sweeteners may additionally initiate an aftertaste significantly different from sucrose. In some embodiments, naringenin may be included in a beverage that further includes one or more sweeteners that lack upfront sweetness and may be included therein in a concentration of between about 5 ppm to about 100 ppm.

In some embodiments, naringenin may be added to a beverage that includes one or more steviol glycosides and that also includes other reagents that may be bitter. In some of those beverages, some level of bitterness may be desirable. That is, the beverage may include a perceptible and desired level of bitterness. Surprisingly, that desired bitterness may be preserved even where a tailing bitter aftertaste, such as may otherwise be provided by steviol glycosides (in the absence of naringenin), is diminished by naringenin. Ingredients that may provide at least some level of bitterness and which may be added to beverages in some embodiments herein include, by way of nonlimiting example, bitter oils (such as, for example, oil of bitter almonds and *cassia* oil), bitter alkaloids (such as, for example, theobromine, theophylline, and caffeine), tea solids, catechins, epicatechins, proanthocyanidins, and any combinations thereof. Beverages that may include one or more bitter compounds and that may further include sweetness include, by way of nonlimiting example, lemon-flavored beverages and some carbonated soft drinks Taste attributes of those beverages may be particularly difficult to balance, which is a problem that may be addressed using naringenin including compositions as described herein.

As described above, naringenin may improve the taste properties of a beverage and may do so without providing other unintended tastes or flavors. For example, in water, naringenin does not elicit any taste or flavor at least up to about 200 ppm. That value is at least about 10 fold higher than levels suitable to improve the taste profile of some beverages. Therefore, as further described herein, naringenin is particularly amenable for use in mixes or bases that may have different ingredients added to them as well as in beverages for which different consumers may add other flavorings or sweeteners. For example, some of those products may be consumed at widely different sweetness levels, and it may be difficult to make a beverage that provides ideal taste properties over the entirety of the sweetness range in which the beverage may be consumed. That problem may be addressed by beverages that include naringenin as described herein.

For example, in contrast to naringenin, some taste modifiers may be suitable for use at one concentration value in a product of one sweetness level and suitable for use at a different concentration value in a product of another sweetness level. However, those concentrations may be significantly different, and for example, when used above a suitable value for one sweetness level, the modifier may add calories, provide other unwanted tastes or flavors, or otherwise interact negatively with other flavors in a beverage. In contrast, naringenin may be added above a concentration value sufficient to modify a sweetness profile and/or remove aftertastes of a beverage and may do so without adding other negative taste perceptions or calories. Therefore, naringenin may be added to a beverage including other sweeteners, and without further adjustment of the amount of naringenin, may serve to improve taste of the beverage at an initial sweetness level as well as other sweetness levels such as may be derived from further addition of sweeteners.

For example, for some beverage products, the total sweetness provided in the beverage or as added by a consumer may range from a level of sucrose equivalent sweetness of between about 15 grams of sucrose to about 30 grams of sucrose per 8 fluid ounces. Naringenin may be added to those beverages in an amount suitable to improve the sweetness profile of the beverage, and the amount of added naringenin may be suitable to improve the sweetness profile over the entirety of the target sweetness range. The target sweetness range may, in some embodiments, include a lower sweetness level that may be determined by a first sweetener or first group of sweeteners (e.g., provided in a packaged or dispensed beverage) and may also include a higher sweetness level. The higher sweetness level of the target range may, for example, be provided from the first sweetener or first group of sweeteners and may also be provided from a second sweetener or second group of sweeteners. For example, one or more second sweeteners may be added at a point of consumption such as by a consumer.

In some embodiments, a first sweetener or first group of sweeteners in a beverage may provide a sucrose equivalent sweetness of between about 15 grams of sucrose to about 25 grams of sucrose per 8 fluid ounces. The first sweetener or first group of sweeteners may provide a level of sweetness that is ideal for a majority of consumers or for a majority of consumers of a particular demographic. Alternatively, the composition may be only partially sweetened. A beverage that is ideally suited for a majority of possible consumers may be referred to as a fully sweetened beverage. A beverage that is sweetened to a level that is less than that of a fully sweetened beverage may be referred to as a partially sweetened beverage. In some embodiments, it may be expected that one or more second sweeteners may provide an equivalent sweetness of between about 5 grams of sucrose to about 15 grams of sucrose per 8 fluid ounces. The beverage may include a level of naringenin such that addition of the one or more second sweeteners does not unbalance the sweetness profile or add negative taste perceptions. For example, a level of naringenin may be in concentrations of between about 20 ppm to 100 ppm.

In some embodiments, a first sweetener or first group of sweeteners may include one or more high-potency and/or non-nutritive sweeteners. Amounts of high-potency and/or non-nutritive sweeteners may be suitable to provide a desired level of sweetness, and in reduced-calorie embodiments, may also be suited to provide a desired reduction in caloric content as compared to a full-calorie product version. And, depending, for example, on a desired level of calorie reduction, a level of nutritive sweeteners may also be included. For example, in some embodiments, one or more nutritive sweeteners including, by way of nonlimiting example, glucose, fructose, galactose, xylose, lactose, ribose, sucrose, lactulose, lactose, maltose, trehalose, another sugar, or combinations thereof may be added. In some embodiments, the first sweetener or first group of sweeteners may include a *stevia* extract at a level between about 80 ppm to about 600 ppm. Within this range, *stevia* extract may be up to about 120 ppm, or up to about 180 ppm, or up to about 250 ppm, or up to about 400 ppm. Also within this range, *stevia* extract may be at least 100 ppm, or at least 150 ppm, or at least 250 ppm.

In some embodiments, the beverage may include naringenin in an amount between about 20 ppm to about 100 ppm, about 30 ppm to about 70 ppm, or about 40 ppm to about 60 ppm. In some embodiments, a level of naringenin added to the beverage may be up to about 20% to about 100% or up to about 50% to about 200% higher than may be necessary to improve the sweetness profile of the first sweetener or first group of sweeteners. For example, in some embodiments, the first sweetener or first group of sweeteners may include about 250 ppm to about 400 ppm of *stevia* extract, and about 10 ppm to about 20 ppm of naringenin may be sufficient to improve the sweetness profile of the beverage. An amount of about 20 ppm to about 40 ppm of naringenin may then, for example, be included in the beverage in order to account for any other sweeteners that a consumer may later add— including sweeteners that are generally not suited for use with the first sweetener or first group of sweeteners. In some embodiments, a level of naringenin added to a beverage may be lower than the taste threshold of naringenin.

A second sweetener or group of sweeteners may include any of various high-potency or non-caloric sweeteners that may be available to a consumer, and may, for example, include sweeteners that may not be ideally suited for use in the provided beverage. For example, a second sweetener or group of sweeteners may possess one or more negative attributes, including for example, aftertastes, off-tastes and/or or lingering sweetness. By way of non-limiting example, off-tastes and/or aftertastes that may be associated with sweeteners may include bitter, astringent, metallic or licorice-like aftertastes, and combinations of the foregoing. For example, saccharin and acesulfame-potassium may provide bitter and/or astringent aftertastes. A consumer may also inadvertently add non-ideal combinations of reagents that shift a perceived temporal profile of sweetness delivery for a resultant beverage. For example, consumers may choose to add one or more non-nutritive sweeteners, such as sucralose, or one or more high-potency sweeteners, such as *stevia* extract, that provide a delayed sweetness with regard to an ideal sweetness profile. Beverages including naringenin and/or naringenin and other taste modifiers may offset or diminish any changes that otherwise may occur in the sweetness profile. Moreover, it has been found that the level of off-tastes may be correlated with a lack of mouthfeel, and because syrup-like texture is added with naringenin, off tastes of sweeteners are generally diminished in the presence of naringenin.

In some embodiments, a beverage may include a first sweetener or group of sweeteners that provides upon consumption an equivalent sweetness that is between about 50% to about 100%, for example, or other suitable percentage, of that of a fully sweetened beverage, and the beverage may further include naringenin at between about 20 ppm to about 100 ppm. Such a beverage may be configured such that addition of an amount of one or more second sweeteners, for example, to provide a total sweetness desired by a consumer, may be accomplished without significant addition of an aftertaste and/or without significant unbalancing of the temporal profile of sweetness delivery.

In some embodiments, iced tea beverages or other beverages for which consumers may typically add a lemon flavor, or other flavors that carry a bitter component, may include naringenin. Beverages may be provided that include one or more sweeteners and those sweeteners may, upon consumption, deliver a level of sweetness that may be optimized for a consumer or group of consumers. In other embodiments, beverages may be provided that, upon consumption, deliver levels of sweetness that are lower than typically desired by a consumer. For example, a beverage may have a total sweetness that is up to about 80% as sweet as a full-calorie version of the beverage.

In some embodiments, beverages may, for example, be reduced in sweetness and calories, and it may be anticipated that a consumer may choose to add some level of another sweetener, e.g., to customize the beverage to the particular level of sweetness that the consumer desires. For example, some consumers may prefer to drink unsweetened or reduced sweetness tea drinks (e.g., iced tea), lemonades, or other beverages. Some consumers may add other sweeteners to those beverages, e.g., to raise the sweetness level. Any number of different sweeteners may be used, and a typical consumer, e.g., one who is not an expert in beverage flavoring, may not be aware of whether a particular sweetener provides, upon consumption, a particular sweetness temporal profile or whether a particular sweetener, upon consumption, provides a certain aftertaste. As described herein, some compositions, and beverages including such compositions, may provide a taste that is similar to a beverage sweetened with natural sugars, or may provide a taste that is similar to natural sugars when the overall sweetness of a beverage is raised. Such beverages may provide taste properties that are similar to beverages using natural sugars, and may do so irrespective of whether, for example, any of various non-sugar sweeteners or combinations of non-sugar sweeteners are added, e.g., to adjust the overall sweetness.

Some embodiments may include high-intensity, high-potency, non-nutritive, reduced-calorie, or other sweeteners in the composition. Without being limited to particular sweeteners, representative categories and examples include:

(a) water-soluble sweetening agents such as monellin, steviosides, *stevia* leaf extract, enzyme modified *stevia*, monatin, luo han guo or derivatives of luo han guo, glycyrrhizin, dihydroflavenol, and sugar alcohols such as sorbitol, mannitol, maltitol, and L-aminodicarboxylic acid aminoalkenoic acid ester amides, such as those disclosed in U.S. Pat. No. 4,619,834, which disclosure is incorporated herein by reference, and a combination comprising any of the foregoing;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and a combination comprising any of the foregoing;

(c) dipeptide-based sweeteners, such as L-aspartic acid derived sweeteners, such as L-aspartyl-L-phenylalamine methyl ester (Aspartame) and materials described in U.S. Pat. No. 3,492,131, L-alpha-aspartyl-N-(2,2,4,4-tetramethyl-3-thietanyl)-D-alaninamide hydrate (Alitame), N—[N-(3,3-dimethylbutyl)-L-aspartyl]-L-phenylalanine 1-methyl ester (Neotame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, and a combination comprising any of the foregoing;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructofuranoside, or 4,1'-dichloro-4,1'-dideoxygalactosucrose; 1',6'-dichloro 1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galacto-pyranosyl-1,6-dichloro-1,6-dideo-xy-beta-D-fructofuranoside, or 4,6,1',6'-tetrachloro-4,6,1',6'-tetradeoxygalacto-sucrose; and 4,6,1',6'-tetradeoxy-sucrose, and a combination comprising any of the foregoing;

(e) protein-based sweeteners such as thaumaoccous danielli (Thaumatin I and II); and (f) the naturally occurring sweetener monatin (2-hydroxy-2-(indol-3-ylmethyl)-4-aminoglutaric acid) and its derivatives, luo han guo and its derivatives.

Many sweetening agents, including some previously discussed herein, can be categorized as natural sweeteners, for example L-alanine, arabinose, banana extract, carob, cellobiose, corn syrup (including high-fructose corn syrup and corn syrup solids), dextrin, dextrose, *Dioscoreophyllum cumminsii* (Serendipity Berry), erythritol, fructooligosaccharide (FOS), fructose, (including "liquid fructose"), galactose, glucose, glycine, glycyrrhizin, honey, inulin, isomalt, invert sugar, lactitol, lactose, luo han (luo han kuo; luo han guo; lohan guo; lohan kuo), maltitol, maltodextrin, maltose, mannitol, mannose, monatin, maple syrup, molasses, partially hydrogenated starch hydrolysate, partially hydrolyzed starch, polydextrose solution, polyglycitol, raftilose, miraculin (*Richadella dulcifica* (Miracle Berry)), ribose, rice syrup, sorbitol, sorbose, *stevia*, stevioside, sucralose, sucrose, sugar beets, (dehydrated filaments of), D-tagatose, thaumatin, xylitol, xylose, sucromalt, and a combination comprising any of the foregoing.

The sweetening agent can be used individually or as a mixture.

The sweetening agents can be used in many distinct physical forms, well-known in the art, to provide an initial burst of sweetness and/or a prolonged sensation of sweetness. Without being limited thereto, such physical forms include free forms, such as spray dried, powdered, beaded forms, encapsulated forms, and a combination comprising any of the foregoing.

Additional natural flavors and colors may, in some embodiments, be added. Flavoring agents include those flavors known to one of ordinary skill in the art, such as natural flavors, artificial flavors, spices, seasonings, and the like. Exemplary flavoring agents include synthetic flavor oils and flavoring aromatics and/or oils, oleoresins, essences, distillates, and extracts derived from plants, leaves, flowers, fruits, and so forth, and a combination comprising any of the foregoing.

Exemplary flavor oils include spearmint oil, cinnamon oil, oil of wintergreen (methyl salicylate), peppermint oil, Japanese mint oil, clove oil, bay oil, anise oil, *eucalyptus* oil, thyme oil, cedar leaf oil, oil of nutmeg, allspice, oil of sage, mace, oil of bitter almonds, and *cassia* oil; useful flavoring agents include artificial, natural and synthetic fruit flavors such as vanilla, and citrus oils including lemon, orange, lime, grapefruit, yazu, sudachi, and fruit essences including apple, pear, peach, grape, blueberry, strawberry, raspberry, cherry, plum, prune, raisin, cola, guarana, neroli, pineapple, apricot, banana, melon, apricot, ume, cherry, raspberry, blackberry, tropical fruit, mango, mangosteen, pomegranate, *papaya* and so forth. Additional exemplary flavors imparted by a flavoring agent include a milk flavor, a cream flavor, a vanilla flavor; tea or coffee flavors, such as a green tea flavor, an oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an *angelica* flavor, a fennel flavor, an allspice flavor, a cinnamon flavor, a chamomile flavor, a mustard flavor, a cardamon flavor, a caraway flavor, a cumin flavor, a clove flavor, a pepper flavor, a coriander flavor, a *sassafras* flavor, a savory flavor, a *Zanthoxyli Fructus* flavor, a *perilla* flavor, a juniper berry flavor, a ginger flavor, a star anise flavor, a horseradish flavor, a thyme flavor, a tarragon flavor, a dill flavor, a *capsicum* flavor, a nutmeg flavor, a basil flavor, a marjoram flavor, a rosemary flavor, a bayleaf flavor, and a wasabi (Japanese horseradish) flavor; a nut flavor such as an almond flavor, a hazelnut flavor, a macadamia nut flavor, a peanut flavor, a pecan flavor, a pistachio flavor, and a walnut flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor.

In some embodiments, other flavoring agents include aldehydes and esters such as cinnamyl acetate, cinnamaldehyde, citral diethylacetal, dihydrocarvyl acetate, eugenyl formate, p methylamisol, and so forth. Further examples of aldehyde flavorings include acetaldehyde (apple), benzaldehyde (cherry, almond), anisic aldehyde (licorice, anise), cinnamic aldehyde (cinnamon), citral, i.e., alpha citral (lemon, lime), neral, i.e., beta citral (lemon, lime), decanal (orange, lemon), ethyl vanillin (vanilla, cream), heliotrope, i.e., piperonal (vanilla, cream), vanillin (vanilla, cream), alpha amyl cinnamaldehyde (spicy fruity flavors), butyraldehyde (butter, cheese), valeraldehyde (butter, cheese), citronellal (modifies, many types), decanal (citrus fruits), aldehyde C 8 (citrus fruits), aldehyde C 9 (citrus fruits), aldehyde C 12 (citrus fruits), 2 ethyl butyraldehyde (berry fruits), hexenal, i.e., trans 2 (berry fruits), tolyl aldehyde (cherry, almond), veratraldehyde (vanilla), 2,6 dimethyl 5 heptenal, i.e., melonal (melon), 2,6 dimethyloctanal (green fruit), and 2 dodecenal (citrus, mandarin), and the like. Generally, any flavoring or food additive such as those described in Chemicals Used in Food Processing, publication 1274, pages 63-258, by the National Academy of Sciences, can be used.

In some embodiments, the composition may include optional additives such as antioxidants, amino acids, caffeine, coloring agents ("colorants," "colorings"), emulsifiers, flavor potentiators, food-grade acids, minerals, micronutrients, plant extracts, phytochemicals ("phytonutrients"), preservatives, salts including buffering salts, stabilizers, thickening agents, medicaments, vitamins, and a combination comprising any of the foregoing additives. Those of ordinary skill in the art will appreciate that certain additives may meet the definition or function according to more than one of the above-listed additive categories.

Compositions described herein can, optionally, further include flavor potentiators. In some embodiments, potentiators may be designed to intensify, supplement, modify, or enhance the perception of flavor, sweetness, tartness, umami, kokumi, saltiness, and combinations thereof.

Examples of flavor potentiators, also known as taste potentiators, include neohesperidin dihydrochalcone, chlorogenic acid, alapyridaine, cynarin, miraculin, glupyridaine, pyridinium-betain compounds, glutamates, such as monosodium glutamate and monopotassium glutamate, neotame, thaumatin, tagatose, trehalose, salts, such as sodium chloride, monoammonium glycyrrhizinate, vanilla extract (in ethyl alcohol), sugar acids, potassium chloride, sodium acid sulfate, hydrolyzed vegetable proteins, hydrolyzed animal proteins, yeast extracts, adenosine monophosphate (AMP), glutathione, nucleotides, such as inosine monophosphate, disodium inosinate, xanthosine monophosphate, guanylate monophosphate, alapyridaine (N-(1-carboxyethyl)-6-(hydroxymethyl)pyridinium-3-ol inner salt), sugar beet extract (alcoholic extract), sugarcane leaf essence (alcoholic extract), curculin, strogin, mabinlin, gymnemic acid, hydroxybenzoic acids, 3-hydrobenzoic acid, 2,4-dihydrobenzoic acid, citrus aurantium, vanilla oleoresin, sugarcane leaf essence, maltol, ethyl maltol, vanillin, licorice glycyrrhizinates, compounds that respond to G-protein coupled receptors (T2Rs and T1Rs), G-protein coupled receptors (T2Rs and T1Rs), and taste potentiator compositions that impart kokumi, as disclosed in U.S. Pat. No. 5,679,397 to Kuroda et al., herein incorporated by reference, and combinations thereof. "Kokumi" refers to materials that impart "mouthfulness" and "good body."

Sweetener potentiators, which are a type of flavor potentiator, enhance the taste of sweetness. In some embodiments, exemplary sweetener potentiators include mono ammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, sugar beet extract, neotame, thaumatin, neohesperidin dihydrochalcone, hydroxybenzoic acids, tagatose, trehalose, maltol, ethyl maltol, vanilla extract, vanilla oleoresin, vanillin, sugar beet extract (alcoholic extract), sugarcane leaf essence (alcoholic extract), compounds that respond to G-protein coupled receptors (T2Rs and T1Rs), G-protein coupled receptors (T2Rs and T1Rs), hydroxybenzoic acid amides as disclosed in WO 2006/024587 to Ley et al., hydroxydeoxybenzoins (hydroxyl-substituted 1,2-diphenylethanones) as disclosed in WO2006/106023 to Ley et al., and combinations thereof.

Additional examples of potentiators for the enhancement of salt taste include acidic peptides, such as those disclosed in U.S. Pat. No. 6,974,597, herein incorporated by reference. Acidic peptides may include peptides having a larger number of acidic amino acids, such as aspartic acid and glutamic acid, than basic amino acids, such as lysine, arginine and histidine. The acidic peptides are obtained by peptide synthesis or by subjecting proteins to hydrolysis using endopeptidase, and if necessary, to deamidation. Suitable proteins for use in the production of the acidic peptides or the peptides obtained by subjecting a protein to hydrolysis and deamidation include plant proteins, (e.g. wheat gluten, corn protein (e.g., zein and gluten meal), soybean protein isolate), animal proteins (e.g., milk proteins such as milk casein and milk whey protein, muscle proteins such as meat protein and fish meat protein, egg white protein and collagen), and microbial proteins (e.g., microbial cell protein and polypeptides produced by microorganisms).

The pH of beverages may also be modified by the addition of food-grade compounds such as ammonium hydroxide, sodium carbonate, potassium carbonate, sodium bicarbonate, and the like, and a combination comprising any of the foregoing. Additionally, the pH of the beverage can be adjusted by the addition of carbon dioxide.

EXAMPLES

Example 1

Naringenin was evaluated in water as shown in Table B. Water used in all beverages described herein was specifically purified prior to use by processes well known in the art such as filtration, deionization, distillation, or reverse osmosis. Evaluation of the samples was performed using evaluation by sensory panelists. Beverage sampling comprised of taking an about 10 mL portion of the beverage into the mouth, holding the sample in the mouth, and rating the sweetness for each sample.

TABLE B

| Naringenin conc., (parts per million "ppm") | Sweetness |
|---|---|
| 0 | No perceptible sweetness |
| 5 | No perceptible sweetness |
| 10 | No perceptible sweetness |
| 20 | No perceptible sweetness |
| 40 | No perceptible sweetness |
| 80 | No perceptible sweetness |
| 100 | No perceptible sweetness |
| 200 | No perceptible sweetness |

As shown by the data in Table B, in water, naringenin does not elicit any taste or flavor.

Example 2

Naringenin was added to the base formula shown in Table C. The base formula of Table C may provide about a 50% reduction in calories as compared to a typical full-calorie beverage.

TABLE C

| Ingredient | Percentage by weight |
|---|---|
| Water | 92.73 |
| Sodium Benzoate | 0.03 |
| Flavor | 0.36 |
| Erythritol | 1.75 |
| Medium Invert Sugar, 76.5% solids | 5.10 |
| Stevia Leaf Extract | 0.03 |
| Total | 100.0 |

Naringenin was added to the base formula at concentrations ranging from about 15 to about 300 ppm as shown in Table D, and resulting reduced-calorie beverages were evaluated and compared to a full-calorie beverage sweetened entirely with medium invert sugar.

TABLE D

| Sample # | Naringenin, ppm |
|---|---|
| 1 | 0 |
| 2 | 15 |
| 3 | 30 |
| 4 | 60 |
| 5 | 120 |
| 6 | 240 |
| 7 | 300 |

Naringenin was found to increase syrup qualities of the beverages, providing a mouthfeel that was similar to the full-calorie beverage. For example, delocalization of sweetness, an attribute that relates to the beverage mouthfeel, was increased. In addition, the upfront sweetness profile was surprisingly increased, an impact that few reagents have been found to elicit. Moreover, the aftertaste of naringenin-including samples became more syrupy, resulting in an aftertaste that was more similar to the full-calorie product. Improvements in sweetness and aftertaste were found for each of the above samples that included naringenin. For example, even at 15 ppm of naringenin, the sweetness profile was significantly improved, and at about 30 ppm of naringenin, the sweetness profile was found to be close to that of the full-calorie product sweetened entirely with natural sugars. Above the 30 ppm value and up to the concentration of about 300 ppm, added naringenin did not provide any noticeable taste impressions or otherwise interfere with flavors included in the beverage samples.

While many examples in this document refer to taste modifiers and compositions and methods including such taste modifiers, it is understood that those compositions and methods are described in an exemplary manner only and that other compositions may be used. For example, any feature in one embodiment may be included in any other embodiment. Additionally, other ingredients may be used, depending on the particular needs. Although the foregoing specific details describe certain embodiments, persons of ordinary skill in the art will recognize that various changes may be made in the details of these embodiments without departing from the spirit and scope of this invention as defined in the appended claims and considering the doctrine of equiva-

What is claimed is:

1. A beverage comprising:
   stevia extract in an amount of about 100 ppm to about 600 ppm;
   wherein said stevia extract provides greater than about 50% of the total sweetness provided in the beverage;
   wherein the most prevalent steviol glycoside of said stevia extract is rebaudioside M;
   wherein said rebaudioside M is present in said stevia extract at a level of between about 30% to about 90% by weight with respect to the total amount of said stevia extract;
   wherein the beverage has a calorie content of less than about 70 calories for an 8 oz portion of said beverage; and
   naringenin in an amount of between about 10 ppm to about 50 ppm;
   wherein the ratio of stevia extract to naringenin is between about 15:1 to about 8:1.

2. The beverage of claim 1, wherein said rebaudioside M is present in said stevia extract at less than about 80% by weight with respect to the total amount of said stevia extract.

3. The beverage of claim 1, wherein said stevia extract further includes at least one of stevioside, rebaudioside B, and rebaudioside C;
   wherein said at least one of stevioside, rebaudioside B, and rebaudioside C are present in an amount of greater than 50% by weight of a remaining percentage of said stevia extract that is in addition to said rebaudioside M.

4. The beverage of claim 2, wherein said stevia extract further includes at least one of rebaudioside B and rebaudioside C,
   wherein said at least one of rebaudioside B and rebaudioside C are present in an amount of greater than 50% by weight of a remaining percentage of said stevia extract that is in addition to said rebaudioside M.

5. The beverage of claim 1, further comprising one or more nutritive sweeteners selected from the group consisting of glucose, fructose, galactose, xylose, lactose, ribose, sucrose, lactulose, maltose, trehalose, and combinations thereof; and
   wherein the beverage is a reduced-calorie beverage that is about 30% to about 95% reduction in calories from a full-calorie version of the beverage.

6. The beverage of claim 1, wherein said naringenin is in an amount of about 15 ppm to about 25 ppm.

7. The beverage of claim 1, further comprising at least one flavor oil selected from a group consisting of lemon, orange, lime, grapefruit, yazu, sudachi and combinations thereof.

8. The beverage of claim 1, further comprising one or more natural flavor oils; and
   wherein the beverage includes only natural sweeteners and natural taste modifiers.

9. A beverage comprising:
   rebaudioside M;
   wherein said rebaudioside M is included in an amount of about 120 ppm to about 600 ppm; and
   naringenin in an amount of between about 10 ppm to about 50 ppm;
   wherein the ratio of rebaudioside M to naringenin is between about 15:1 to about 8:1.

10. The beverage of claim 9, wherein said rebaudioside M is included in said beverage as a stevia extract; and
    wherein said stevia extract further includes at least one of stevioside, rebaudioside B, and rebaudioside C.

11. The beverage of claim 9, wherein said rebaudioside M is included in said beverage as a stevia extract; and
    wherein said stevia extract further includes at least one of rebaudioside B and rebaudioside C.

12. The beverage of claim 9, further comprising one or more nutritive sweeteners selected from the group consisting of glucose, fructose, galactose, xylose, lactose, ribose, sucrose, lactulose, maltose, trehalose, and combinations thereof; and
    wherein the beverage has a calorie content of less than about 70 calories for an 8 oz portion of said beverage.

13. The beverage of claim 9, wherein the beverage is an all-natural lemon flavored beverage and provides upon consumption about 45 calories to about 65 calories per 8 fluid ounces of said beverage.

14. The beverage of claim 9, wherein said naringenin is in an amount of about 10 ppm to about 20 ppm.

15. The beverage of claim 9, wherein the beverage is a reduced-calorie beverage and includes a calorie reduction of about 30% to about 100% from a full-calorie version of the beverage.

16. A beverage comprising:
    stevia extract in an amount of about 100 ppm to about 600 ppm,
    wherein said stevia extract includes rebaudioside M;
    wherein the rebaudioside M is present in the stevia extract at about 30% to about 99.9% by weight with respect to the total amount of said stevia extract;
    one or more high-potency or non-nutritive sweeteners;
    wherein said one or more high-potency or non-nutritive sweeteners are deficient in upfront sweetness and selected from the group consisting of erythritol, mogroside V, aspartame, sucralose, and combinations thereof; and
    naringenin at about 20 ppm to about 100 ppm.

17. The beverage of claim 16, wherein the ratio of stevia extract to naringenin is between about 15:1 to about 8:1.

18. The beverage of claim 16, wherein the beverage is an all-natural lemon flavored beverage and provides upon consumption about 45 calories to about 65 calories per 8 fluid ounces of said beverage.

19. The beverage of claim 16, wherein the beverage is a reduced-calorie soft drink and provides up to about 70 calories per 8 fluid ounces of said beverage upon consumption.

* * * * *